July 29, 1930.                N. W. HENDRYX                1,771,491
                                BIRD CAGE
                       Filed April 16, 1928    2 Sheets-Sheet 1
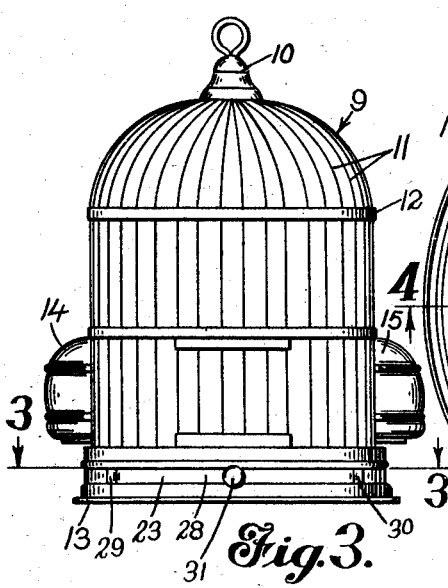
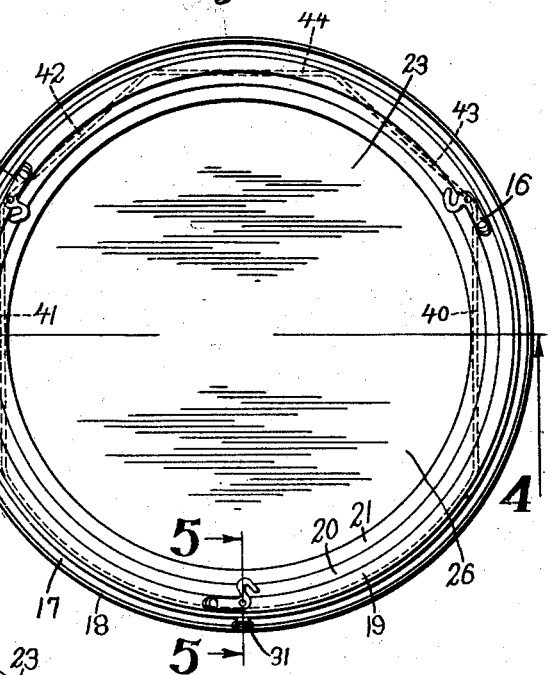
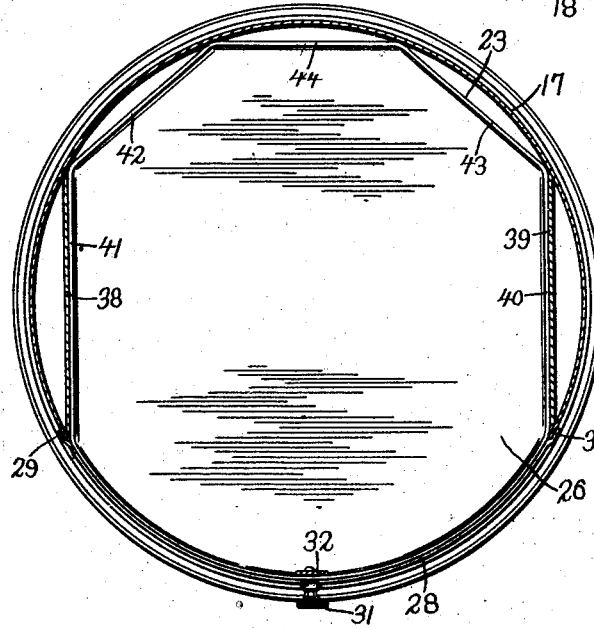
Inventor
Nathan W. Hendryx
By Rockwell & Bartholow
Attorneys July 29, 1930.  N. W. HENDRYX  1,771,491
BIRD CAGE
Filed April 16, 1928  2 Sheets-Sheet 2
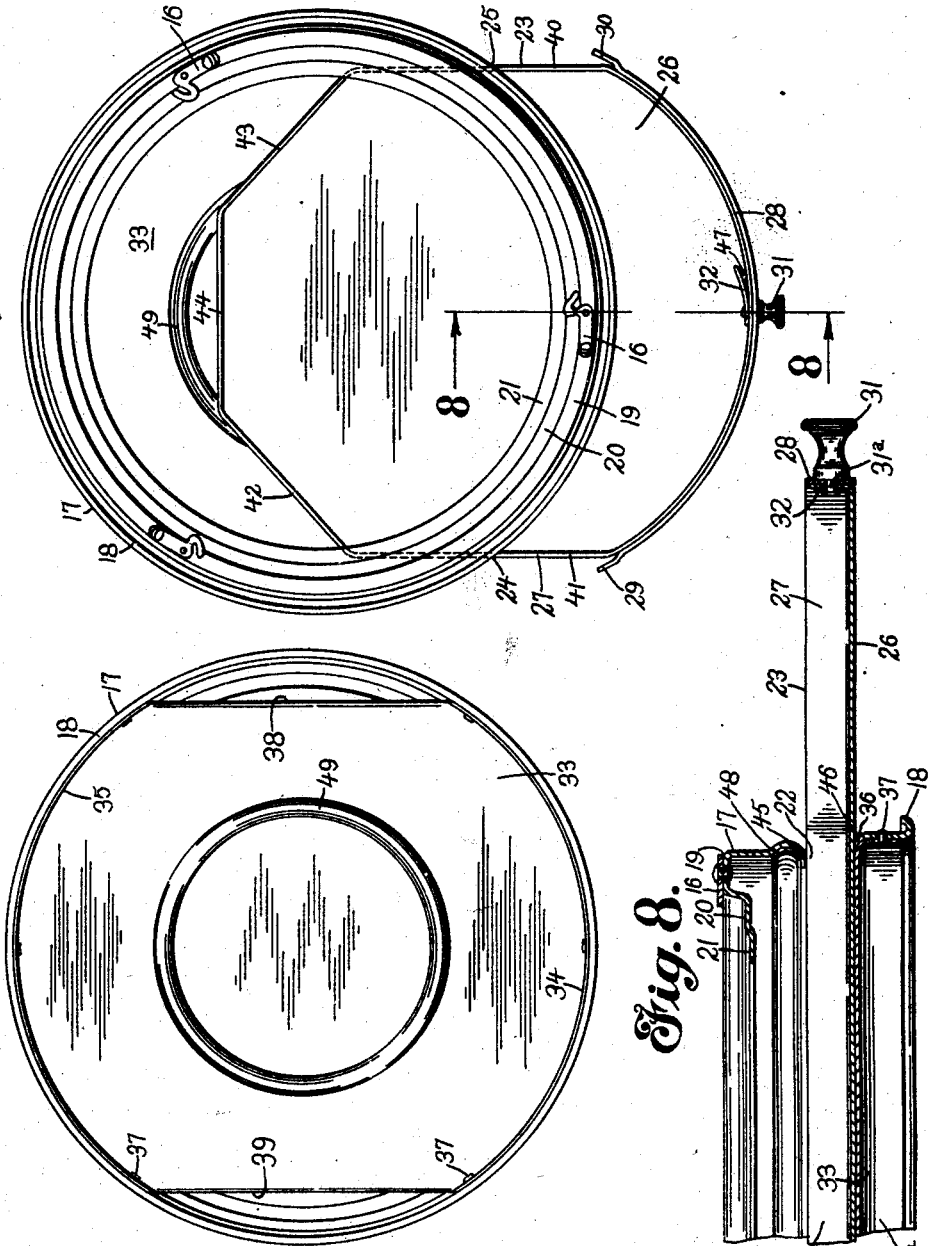

Patented July 29, 1930

1,771,491

UNITED STATES PATENT OFFICE

NATHAN W. HENDRYX, OF NEW HAVEN, CONNECTICUT, ASSIGNOR TO THE A. B. HENDRYX COMPANY, OF NEW HAVEN, CONNECTICUT

BIRD CAGE

Application filed April 16, 1928. Serial No. 270,353.

My invention relates to a bird cage, and more especially to a base for a bird cage.

The usual bird cage is provided with a shallow dish-like base or bottom in which seeds and droppings collect, often in places wherein they are relatively inaccessible, necessitating the detachment of the base periodically, from the rest of the cage structure, in order that it may be cleaned. It has been proposed heretofore to provide a slidable drawer in the base of a bird cage in which the seeds and droppings may collect, the drawer being removable from the base for cleaning purposes. The present invention relates in particular to a bird cage base provided with a removable drawer therein.

It is an object of the present invention to provide a bird cage base having a drawer in which means is provided for guiding the drawer into the drawer receiving opening of the base.

Another object of the invention resides in an efficient supporting and positioning means for a drawer in a bird cage base.

A further object of the invention is to provide means for preventing seeds and droppings from collecting in inaccessible parts of the bird cage base and for insuring that all, or substantially all, of this matter will be collected in a removable drawer.

In a more specific aspect, the invention relates to a bird cage base made out of sheet materials, and it is an object of the invention to bring about a base of the latter type which is provided with a drawer and in which the construction is simpler and sturdier than the previously known bird cage bases.

To these and other ends, the invention consists in the novel features and combination of parts to be hereinafter described and claimed.

In the drawings,

Fig. 1 is a general view showing a bird cage having a base made in accordance with my invention;

Fig. 2 is a plan view of the base shown in Fig. 1, but on an enlarged scale;

Fig. 3 is a sectional view along line 3—3 of Fig. 1, but on an enlarged scale;

Fig. 4 is a sectional view along line 4—4 of Fig. 2, partly broken away;

Fig. 5 is a sectional view along line 5—5 of Fig. 2, but on a different scale;

Fig. 6 is a bottom view of the base shown in Fig. 2;

Fig. 7 is a view similar to Fig. 2, but showing the drawer partly removed from the base; and Fig. 8 is a view along line 8—8 of Fig. 7, but on an enlarged scale.

Referring now to the accompanying drawings in which I have illustrated my invention by showing a preferred embodiment thereof, the reference numeral 9 indicates, in general, a bird cage structure which comprises, generally speaking, a tip 10, downwardly and divergingly extending wires 11, horizontal bars 12, base 13, and feed cups 14 and 15, base 13 being connected to the upper structure of the cage in any usual or suitable manner, as, for example, by means of hooks 16. These are the usual parts of a bird cage and in the usual bird cage, the base is detachable from the upper structure for cleaning and other purposes, as, for example, by means of hooks such as those indicated by the reference numeral 16.

In order that the base 13 may not have to be detached for cleaning purposes, I propose to provide a detachable portion therein specifically, a drawer, the drawer being arranged to catch any seeds and droppings, or other refuse.

Referring again to the drawings, it will be seen that the base 13 comprises a ring-like shell or outer body 17 which is preferably pressed out of sheet material and which is provided with a rolled edge 18, upon which the base may rest, an inwardly extending substantially horizontal upper wall 19, which is provided with a depression 20 for the reception of the upper part of the bird cage, and a further inwardly extending part 21 for a purpose to be hereinafter pointed out.

In shell 17, in a position substantially midway between edge 18 and wall 19, is a horizontal opening 22, through which a drawer 23 may be inserted into the base, opening 22 extending circumferentially of shell 17 substantially less than 180°, as, for example, from the point indicated by reference numeral 24 in Fig. 7 to the point indicated by reference numeral 25. Drawer 23 is preferably made out of sheet material and comprises, in general, a bottom 26, upwardly extending side walls 27, preferably formed integrally therewith, and a drawer front 28 having ends 29 and 30, which overlie the walls of shell 17 adjacent the ends 24 and 25 of opening 22. At substantially the middle point of drawer front 28 is a knob 31 provided with a shank 31ª extending through the drawer front, shank 31ª having mounted thereon a locking arm 32 which may be rotated by knob 31 into engagement with an inner part of base 13 to secure the drawer therein, knob 31 also serving as a convenient means to move the drawer into and out of base 13.

Drawer 23 is supported in base 13 by a substantially horizontally extending bottom plate 33, preferably pressed out of sheet material and having integrally formed downwardly projecting flanges 34 and 35 which are received within an inwardly extending or cupped-out portion 36 of shell 17, flanges 34 and 35 being secured to shell 17 by spot welding, riveting or in any other desirable manner, the particular means shown being rivets which are indicated by reference numeral 37. On either side of plate 33 and in alignment with the edges 24 and 25 of opening 22 are upwardly directed parallel flanges or drawer guides 38 and 39 which are integrally formed with respect to the plate 33, drawer guides 38 and 39 receiving therebetween the parallel upper wall parts 40 and 41 of drawer 23, upper wall 27 of drawer 23 having inwardly tapering parts 42 and 43, terminating in a transverse wall 44. It is to be noted that the walls of shell 17 at the upper and lower edges 45 and 46 of opening 22 are curved inwardly and serve to guide the drawer 23 into the opening 22. If desired, the plate 33 may be stiffened by suitable means, as, for example, by pressing an annular rib 49 therein.

It will be readily understood from the above description of the preferred embodiment of my invention shown in the drawings that the drawer may be readily inserted into opening 22 in the base, the curved portions of the base adjacent the edges of the opening 22 cooperating with the inner end of the drawer to position it in the opening while the tapering wall portions 42 and 43 of the drawer guide the drawer in the opening into a position wherein the drawer may be received between the upwardly disposed flanges 38 and 39 on bottom plate 33. When the drawer is fully inserted into the base, knob 31 may be rotated to bring locking arm 32 into contact with an inner portion of the base, in the particular embodiment illustrated, the locking arm being provided with a stud 47 which engages a groove 48 in shell 17 to secure the knob against movement.

When the drawer is fully inserted in base 13, the part 21 of shell 17 extends outwardly over the side walls of the drawer, as shown in Fig. 2, thus insuring that the seeds and droppings will fall into the drawer where they may be readily removed by withdrawing the drawer from the base.

The improved bird cage base while possessing considerable strength and rigidity is relatively simple, there being but three main parts, the shell, bottom and drawer. The structure of the bottom plate is such that not only does it provide an efficient means for guiding and positioning the drawer in the base but also lends considerable rigidity to the base.

While I have shown and described a preferred embodiment of my invention, it is to be understood that the same is not to be limited to all the details shown but is capable of modification and variation within the spirit of the invention and the scope of the appended claims.

What I claim is:

1. In a bird cage, a base, and a drawer in said base, said base being provided with an opening through which the drawer may be inserted and withdrawn, and a bottom on which the drawer rests, said bottom being made out of sheet material and being provided with oppositely disposed upwardly directed flanges between which the drawer is received and positioned, and oppositely disposed downwardly directed flanges, and means for securing said last named flanges to the base.

2. In a bird cage, a base, and a drawer in said base, said base being provided with a ring-like body provided with an opening through which the drawer may be inserted and withdrawn, and a bottom on which the drawer rests, said bottom being provided on two of its opposite edges with upwardly directed integrally formed parts which cooperate with the drawer to position the latter in the base and downwardly extending parts arranged on the edges thereof between the upwardly extending parts, and means for securing the downwardly extending parts to the ring-like body.

3. In a bird cage, a base, and a drawer in said base, said base comprising a ring-like shell provided with a horizontal opening through which the drawer may be inserted and withdrawn, the portions of said ring-like body immediately above and below the opening being curved respectively downwardly and inwardly and upwardly and inwardly to guide the drawer into said opening.

4. In a bird cage, a base, and a drawer in said base, said base including a ring-like shell provided with an opening through which the drawer may be inserted and withdrawn, said shell being provided with an inwardly and upwardly curved outer surface just beneath the opening to guide the drawer thereinto.

5. In a bird cage, a base, and a drawer in said base, said base including a ring-like shell pressed out of sheet material and provided with an opening through which the drawer may be inserted and withdrawn, said shell being provided with an inwardly directed part immediately below said opening and a bottom plate made of sheet material seated on said inwardly directed part, said bottom plate being provided with oppositely disposed upwardly directed flanges between which the drawer is received.

6. In a bird cage, a base, and a drawer in said base, said base including a ring-like shell pressed out of sheet material and provided with an opening through which the drawer may be inserted and withdrawn and a bottom plate, said bottom plate being provided on two of its opposite edges with upwardly directed flanges between which the drawer is received and downwardly and outwardly directed flanges on the edges between said first named flanges, said shell being provided with an inwardly directed portion immediately below the opening and the downwardly directed flanges being seated on said portion.

7. In a bird cage, a base, and a drawer in said base, said base including a ring-like shell pressed out of sheet material and provided with an opening through which the drawer may be inserted and withdrawn and a bottom plate, said bottom plate being provided on two of its opposite edges with upwardly directed flanges between which the drawer is received and downwardly and outwardly directed flanges on the edges between said first named flanges, said shell being provided with an inwardly directed portion immediately below the opening and the downwardly directed flanges being seated on said portion, and means for securing the second named flanges to the shell.

8. In a bird cage, a circular base and a drawer in said base, said drawer being provided with parallel side edges, said base including a ring-like shell pressed out of sheet material and provided with an opening through which the drawer may be inserted and withdrawn, and a bottom plate, said bottom plate having upstanding drawer guiding parts extending inwardly from the opening and between which the side edges of the drawer are received, said shell being provided with an inwardly directed portion immediately below the opening and the bottom plate being provided on its peripheral edges with downwardly extending portions shaped to fit the inwardly directed portion of the shell and secured therein.

9. In a bird cage, a circular base, and a drawer in said base, said drawer being provided with parallel side walls, said base including a ring-like shell pressed out of sheet material and provided with an opening through which the drawer may be inserted and withdrawn, and an inwardly curved lower rim part, a bottom plate shaped on its edge portions to fit into the inwardly curved rim part of the shell, said bottom plate having a flat upper face on which the drawer rests, and upwardly extending parallel drawer guides extending inwardly on the upper surface of the plate from the edges of the opening, the parallel sides of the drawer being received between the guides when the drawer is inserted in the base.

10. In a bird cage, a circular base, and a drawer in said base, said drawer being provided with parallel upstanding portions at the sides thereof, said base including a ring-like shell pressed out of sheet material and provided intermediate its upper and lower edges with an opening through which the drawer may be inserted and withdrawn, and a bottom plate, said bottom plate having connected therewith upstanding drawer-guiding parts extending inwardly in substantially straight lines from the sides of the opening and adapted to engage the upstanding portions at the sides of the drawer, said shell being provided with an inwardly directed portion below the opening, and the bottom plate being provided on its periphery in a region between said upstanding drawer-guiding parts with an integral downwardly turned curved portion seated on the inwardly directed portion of the shell, said bottom plate being permanently fastened to the shell.

In witness whereof, I have hereunto set my hand this 12th day of April, 1928.

NATHAN W. HENDRYX.